Patented July 26, 1949

2,477,117

UNITED STATES PATENT OFFICE 2,477,117

ELECTRIC WELDING MACHINE AND CONTROL MEANS THEREFOR

Irvin W. Cox, West Allis, and Lester D. Drugmand, Greenfield, Wis., assignors to Cutler-Hammer, Inc., Milwaukee, Wis., a corporation of Delaware Application December 6, 1947, Serial No. 790,194

5 Claims. (Cl. 219—4)

This invention relates to electric welding machines and their control, and while not limited thereto is especially adapted for the welding of materials of relatively low specific resistance and small mass.

To produce a strong weld it is in many cases desirable initially to juxtapose the parts which are to be welded together with a low contact pressure thus affording a relatively high contact resistance so that upon passage of a welding current across their contacting surfaces sufficient heat is liberated to melt and flow together the material at these surfaces. However, as the welding electrodes and the mechanism for their operation have a relatively large mass, a small force is insufficient to thereafter quickly accelerate said mass for the necessary followup of the electrodes when the metal at the interface softens and melts. The result is a temporary reduction of contact pressure which may lead to an arc at the electrodes or at the interface causing the blowing out or "spitting" of the molten metal from the interface and resulting in a poor weld.

It is furthermore often desirable to hold the weld under pressure for a short period after the flow of welding current ceases, to produce a "coining" effect on the weld which densifies the material thereof.

An object of the invention is to provide a welding machine with means affording at the interface between the parts to be welded a low contact pressure at the moment of initiation of welding current flow and to supplement said pressure by a magnetic force induced by and varying in accordance with the magnitude of the welding current.

Another object is to provide novel and improved means for supplying a contact pressure varying with the welding current regardless of the skill or lack of skill of the operator.

Another object is to provide welding apparatus in which the welding pressure is not materially affected by the inertia of the welding jaws and the actuating elements thereof.

Another object is to provide a welding current control which affords densification of the material in the weld.

Other objects and advantages of the invention will hereinafter appear.

The accompanying drawings illustrate an embodiment of the invention.

Figure 1:
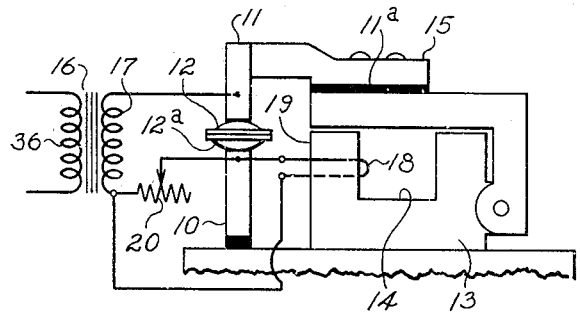
Figure 1 illustrates schematically and diagrammatically a welding head constructed in accordance with the present invention and showing the special form of welding transformer associated therewith.

Referring to Fig. 1, the welding head comprises a stationary lower welding electrode 10 and a cooperating movably supported upper welding electrode 11. Mounted adjacent the stationary electrode 10 is the stationary U-shaped frame 13 of an electromagnet 14 which is provided with an oscillatable armature 15, hinged to the frame 13. The movable electrode 11 is supported on one end of the armature 15, but electrically insulated from the latter in a suitable manner, as indicated at 11ª. The arrangement is such that electrode 11 may be reciprocated relatively to the stationary electrode 10 as an incident to oscillation of the armature 15. Part of the unbalanced weight of the armature 15 may be counterbalanced by any suitable means, such as a spring (not shown), if desired, or when required to limit the initial pressure of the movable electrode on the work, as represented by the parts 12 and 12ª (Fig. 1).

If it is desired to increase the initial pressure on the work, the magnet 14 (Fig. 1) may be provided with a suitably energized supplemental biasing coil (not shown). Current to the electrodes 10 and 11 is supplied by a welding transformer 16 which has one terminal of its secondary winding 17 connected to the movable electrode 11. The other terminal of said secondary winding 17 is connected through an energizing winding 18 to the stationary electrode 10. The energizing winding 18 is mounted upon the pole 19 of the electromagnet frame 13. Hence the welding current flows from the secondary winding 17, through the electrode 11, the parts 12 and 12ª to be rigidly united or welded, the electrode 10, the winding 18, back to the secondary winding 17. It may further be desirable, for certain operations, to shunt the energizing winding 18 by an adjustable impedance as shown at 20.

The operation of the system is as follows: After the parts 12 and 12ª have been placed between the electrodes 10 and 11 a slight pressure is exerted upon said parts by the unbalanced weight of the armature 15; which pressure may, if desired, be augmented by any suitable means (not shown), such as a hand lever or foot lever attached to the armature.

Thereupon the welding transformer 16 is energized so that a current flows through the secondary winding 17 and between the electrodes 10 and 11 through the parts 12 and 12ᵃ to be united or welded. This welding current flowing through the adjacent faces of the pieces to be welded together causes melting of the material forming said adjacent faces. The welding current flowing through the energizing winding 18 induces a flux in the electromagnet 14 which produces a force pulling the movable electrode 11 toward the stationary electrode 10. This in turn increases the degree of completeness of contact between the two parts to be welded together. As a result the electrode 11 "follows through" in accordance with the magnitude of the current so that a perfect weld is obtained. As soon as the weld is completed the current may be cut off. This causes the material in the weld to solidify and the apparatus is ready for another operation.

The welding head is equally applicable to direct current or alternating current welding, and any suitable means may be employed to initiate and terminate the flow of welding current. For instance, it may be desirable to terminate the welding current when the resistance at the adjacent faces of the parts to be welded has decreased to a given value, or it may be desired to control the duration of the flow of welding current and thus the total energy supplied to the weld.

The welding pressure which is exerted upon the weld by the magnetic flux induced by the energizing winding 18 may be varied by providing said winding 18 with a plurality of turns and with adjustable means (not shown) for selecting the number of turns to be rendered active, according to the particular pressure desired. If an energizing winding 18 consisting of a single turn affords too high a pressure said winding may be shunted by an adjustable impedance, as indicated at 20, so as to reduce that amount of the welding current which produces the supplemental pressure between the welding electrodes 10 and 11. It will further be obvious that other modifications in the welding head and in the relative arrangement of the parts thereof may be made without departing from the spirit of the present invention.

Figure 2:
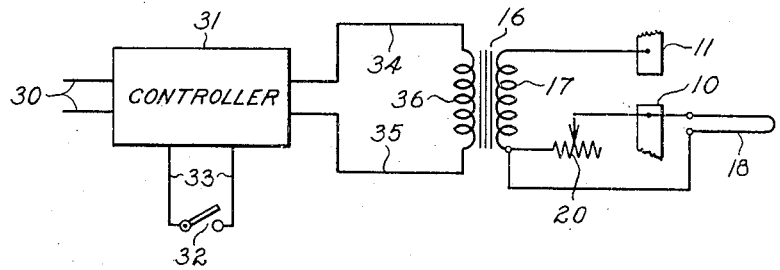
Fig. 2 illustrates diagrammatically a system for supplying energy from an alternating current source to the welding head.

Referring to Fig. 2, wherein we have illustrated a control circuit of simple type for supplying energy from an alternating current source to the welding head; the system comprises a pair of alternating current supply lines 30, which supply current to a controller of any suitable type schematically indicated by the rectangle 31. The controller 31 is adapted to provide for supply of a single unidirectional pulse of welding energy upon closure of a control switch 32, of a suitable type, connected to the controller 31 by means of wires 33. The output wires 34 and 35 of the controller 31 are connected across the primary winding 36 of the welding transformer 16, like that shown in Fig. 1. Upon closure of the switch 32 the controller 31 will supply an output energy impulse to the winding 36. As aforestated, any suitable controller for supplying a regulable unidirectional current impulse from an alternating source may be employed. A controller of this type is disclosed in detail in the application of Lester D. Drugmand, Serial No. 17,455, filed March 27, 1948, for Welding system, and assigned to the same assignee as the present application.

The system shown in Fig. 2 operates in the following manner: After the parts to be welded are introduced between the electrodes 10 and 11 the switch 32 is closed whereupon a unidirectional current impulse is supplied to the primary winding 36 of transformer 16. This current impulse induces a corresponding current impulse in the secondary winding 17, whereupon the welding head functions in the manner aforedescribed. It is to be understood that the controller 31 in general supplies only a single unidirectional impulse to the primary winding 36, and in order to afford a second welding impulse the switch 32 must be opened and reclosed.

Figure 3:
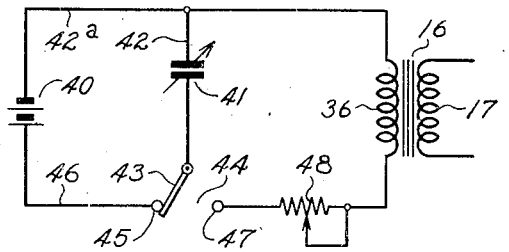
Fig. 3 illustrates diagrammatically an arrangement of parts wherein the welding energy is supplied from an energy storing condenser.

Referring to Fig. 3, the same illustrates a control circuit of simple type for supplying energy to the welding head from a direct current source 40. A capacitor 41, which may have adjustable capacity (as shown), has one of its terminals connected by wires 42 and 42ᵃ to one terminal of the source 40, while the other terminal of capacitor 41 is connected to the movable contact 43 of a double-throw switch 44, which is also provided with stationary contacts 45 and 47 adapted to be engaged selectively by the contact 43. The stationary contact 45 is connected by a wire 46 to the second terminal of the source 40, and the stationary contact 47 is connected through an adjustable resistor 48 and the primary winding 36 of welding transformer 16 to the common terminal of the capacitor 41 and the source 40. The secondary winding 17 of transformer 16 is connected in series with winding 18 between the stationary and movable electrodes 10 and 11 of the welding head (not shown) in the manner illustrated in Figs. 1 and 2.

If it is desired to make a weld, the parts to be welded are placed between the electrodes 10 and 11, as heretofore described; the switch 44 being in the position shown in Fig. 3. The capacitor 41 is fully charged with energy from the source 40. The operator now moves the contact blades 43 counterclockwise, thus interrupting the connection of the capacitor to the source 40 and establishing a discharge circuit for the capacitor through the winding 36. This induces a welding current in winding 17 through the parts to be welded. The magnitude of the initial discharge current, being a function of the resistance through the parts being welded causes melting of the material or materials at the adjacent faces of the parts to be welded. The current flowing through the aforementioned winding 17 creates a pressure between the electrodes 11 and 10 which supplements the initial pressure in accordance with the resistance of the discharge circuit and hence of the resistance at said adjacent faces, so that the electrode 11 is pressed toward stationary electrode 10 with a supplemental force, thereby producing a follow-up pressure at the weld, as aforedescribed.

The energy supplied to the weld may be varied by varying the capacitance of the capacitor 41, while the rate of energy supply as well as the initial magnitude of the welding current may be varied by adjustment of the resistor 48. Other methods of varying the rate of energy supply to the weld and/or the total energy of a welding current impulse will at once suggest themselves to those skilled in the art.

It is apparent that a time lag may exist between the current and the magnetic flux of the electromagnet 14 and hence of the pressure between the electrodes 11 and 10 relative to the current flowing through the weld. Therefore by suitable adjustment of the characteristics of the welding circuit it is possible to vary the time-phase displacement between the variations of the current and the variations of the pressure exerted on the weld. For certain applications it is desirable that the maximum pressure exerted upon the weld shall occur coincidently with, or even after, the cessation of current flow in order to produce a coining action on the solidifying metal of the weld, and the arrangement disclosed affords such operation by suitable selection and/or adjustment of the characteristics of the component parts.

In the welding method hereinabove described, the welding cycle is started with a relatively low pressure exerted by the electrodes 10 and 11 upon the parts, and the pressure is augmented by a force resulting from the flow of welding current. Under certain conditions it may be desirable to start the welding cycle with an initially relatively high pressure and to subsequently reduce said pressure in accordance with the magnitude of the welding current. In such an event the electromagnet 13 must obviously be so related to the movable electrode 11 that the magnetic force, when applied thereto, is opposed to the initial pressure afforded by said movable electrode.

We claim:

1. In a welding system functioning upon supply thereto of a single unidirectional pulse of electric energy, in combination, relatively movable welding electrodes, means insuring said electrodes being pressed together when supply of electrical energy thereto is initiated and affording a wide change in pressure during supply of electrical energy to said electrodes, said means comprising an electromagnet having a coil in series with said electrodes and having relatively movable magnetic parts which in response to the magnetic flux induced therein by said coil vary directly the electrode pressure, said magnetic parts affording said coil a magnetic circuit characterized by small proportions of its total air gap for low reluctance of said magnetic circuit, and means to supply to the series circuit of said electrodes and said coil a single unidirectional pulse of electric energy thereby to effect a weld under varying pressure conditions controlled automatically through the medium of said coil.

2. In a welding system functioning upon supply thereto of a single unidirectional pulse of electric energy, in combination, relatively movable welding electrodes, means insuring said electrodes being pressed together when supply of electrical energy thereto is initiated and affording a wide change in pressure during supply of electrical energy to said electrodes, said means comprising an electromagnet having a coil in series with said electrodes and having relatively movable magnetic parts which in response to the magnetic flux induced therein by said coil vary directly the electrode pressure, said magnetic parts affording said coil a magnetic circuit characterized by small proportions of its total air gap for low reluctance of said magnetic circuit, and means to supply to the series circuit of said electrodes and said coil a single unidirectional pulse of electric energy thereby to effect a weld under varying pressure conditions controlled automatically through the medium of said coil, said coil having associated therewith means by which may be regulated the timing of change by said coil of the electrode pressure in relation to initiation of the pulse of energy supply to said electrodes and said coil.

3. In a welding system functioning upon supply thereto of a single unidirectional pulse of electric energy, in combination, relatively movable welding electrodes, means insuring said electrodes being pressed together when supply of electrical energy thereto is initiated and affording a wide change in pressure during supply of electrical energy to said electrodes, said means comprising an electromagnet having a coil in series with said electrodes and having relatively movable magnetic parts which in response to the magnetic flux induced therein by said coil vary directly the electrode pressure, said magnetic parts affording said coil a magnetic circuit characterized by small proportions of its total air gap for low reluctance of said magnetic circuit, and means to supply to the series circuit of said electrodes and said coil a single unidirectional pulse of electric energy thereby to effect a weld under varying pressure conditions controlled automatically through the medium of said coil, said coil having associated therewith an impedance shunt.

4. In a welding system functioning upon supply thereto of a single unidirectional pulse of electric energy, in combination, relatively movable welding electrodes, means insuring said electrodes being pressed together when supply of electrical energy thereto is initiated and affording a wide change in pressure during supply of electrical energy to said electrodes, said means comprising an electromagnet having a coil in series with said electrodes and having relatively movable magnetic parts which in response to the magnetic flux induced therein by said coil vary directly the electrode pressure, said magnetic parts affording said coil a magnetic circuit characterized by small proportions of its total air gap for low reluctance of said magnetic circuit, and means to supply to the series circuit of said electrodes and said coil a single unidirectional pulse of electric energy thereby to effect a weld under varying pressure conditions controlled automatically through the medium of said coil, said coil being of low inductance and having associated therewith an impedance shunt.

5. In combination, cooperating relatively movable welding electrodes, an electromagnet having relatively movable magnetic parts including a biased part by which prior to energization of said electromagnet one of said electrodes is pressed towards the other, said electromagnet having an energizing coil in series with said electrodes and being afforded by said relatively movable magnetic parts a magnetic circuit characterized by small proportions of its total air gap for low reluctance of the magnetic circuit, and means to supply to said electrodes a single unidirectional pulse of electric energy thereby to effect a welding operation accompanied by energization of said coil with a resultant predetermined change in electrode pressure upon progress of the welding operation.

IRVIN W. COX.
LESTER D. DRUGMAND.

REFERENCES CITED

The following references are of record in the file of this patent:

UNITED STATES PATENTS

| Number | Name | Date |
| --- | --- | --- |
| 1,985,107 | Roth | Dec. 18, 1934 |
| 2,382,711 | Hagedorn | Aug. 14, 1945 |
| 2,401,528 | Vang | June 4, 1946 |